(12) United States Patent
Buck et al.

(10) Patent No.: US 8,479,091 B2
(45) Date of Patent: Jul. 2, 2013

(54) AUTOMATED ASSEMBLY OF A COMPLEX DOCUMENT BASED ON PRODUCTION CONSTRAINTS

(75) Inventors: Arlene J. Buck, Webster, NY (US); Javier A. Morales, Irondequoit, NY (US); Michael E. Farrell, Ontario, NY (US)

(73) Assignee: Xerox Corporation, Norwalk, CT (US)

( * ) Notice: Subject to any disclaimer, the term of this patent is extended or adjusted under 35 U.S.C. 154(b) by 768 days.

(21) Appl. No.: 11/741,817

(22) Filed: Apr. 30, 2007

(65) Prior Publication Data

US 2008/0270470 A1    Oct. 30, 2008

(51) Int. Cl.
*G06F 17/00*    (2006.01)

(52) U.S. Cl.
USPC .......................................... 715/243; 715/200

(58) Field of Classification Search
USPC ......................................... 715/200, 243, 255
See application file for complete search history.

(56) References Cited

U.S. PATENT DOCUMENTS

| | | | |
|---|---|---|---|
| 5,231,566 A | 7/1993 | Blutinger et al. | |
| 5,446,653 A * | 8/1995 | Miller et al. | 705/4 |
| 5,465,213 A | 11/1995 | Ross | |
| 5,740,425 A | 4/1998 | Povilus | |
| 6,173,286 B1 * | 1/2001 | Guttman et al. | 715/234 |
| 6,182,095 B1 | 1/2001 | Leymaster et al. | |
| 6,189,019 B1 | 2/2001 | Blumer et al. | |
| 6,192,381 B1 | 2/2001 | Stiegemeier et al. | |
| 6,317,650 B1 | 11/2001 | Powell et al. | |
| 6,356,903 B1 * | 3/2002 | Baxter et al. | 707/10 |
| 6,366,918 B1 | 4/2002 | Guttman et al. | |
| 6,578,030 B1 | 6/2003 | Wilmsen et al. | |
| 6,611,840 B1 | 8/2003 | Baer et al. | |
| 6,678,695 B1 | 1/2004 | Bonneau et al. | |
| 6,868,392 B1 | 3/2005 | Ogasawara | |
| 6,898,601 B2 | 5/2005 | Amado et al. | |
| 6,901,408 B2 | 5/2005 | Fachat et al. | |
| 6,978,273 B1 | 12/2005 | Bonneau et al. | |
| 6,981,214 B1 | 12/2005 | Miller et al. | |
| 7,024,022 B2 | 4/2006 | Harrington et al. | |
| 7,047,490 B1 | 5/2006 | Markovic et al. | |
| 7,092,552 B2 | 8/2006 | Harrington et al. | |
| 7,103,605 B1 | 9/2006 | Hazi et al. | |

(Continued)

OTHER PUBLICATIONS http://s7ondemand1.scene7.com/sondemand/brochure/flash_brochure.jsp?company=eBay . . . ; Fall's Top 5 Trends; printed Sep. 19, 20061 p. 1.

(Continued)

*Primary Examiner* — Manglesh M Patel
(74) *Attorney, Agent, or Firm* — Fox Rothschild LLP

(57) ABSTRACT

A method for assembling a document generates a set of candidate content items for inclusion in the document. The content items may be stored in a computer-readable storage medium. A set of production criteria for printing the candidate content items as a document may be selected. An inclusion constraint is automatically applied to the set of production criteria. If the set of production criteria does not satisfy the inclusion constraint, a conflict may be resolved. One or more production criteria in the set may be identified that may be modified. A user selection of at least one production criteria that may be modified may be received. The identified production criteria may be modified according to the user selection. A document may be created that includes the modified production criteria and the candidate content items. The document may be published.

16 Claims, 5 Drawing Sheets

U.S. PATENT DOCUMENTS

| | | |
|---|---|---|
| 7,107,221 B1 | 9/2006 | Tracy et al. |
| 7,107,525 B2 | 9/2006 | Purvis |
| 7,124,096 B2 | 10/2006 | Dutta et al. |
| 7,171,617 B2 * | 1/2007 | Harrington et al. ............ 715/255 |
| 7,171,618 B2 | 1/2007 | Harrington et al. |
| 7,171,620 B2 | 1/2007 | Castellani et al. |
| 7,305,616 B1 | 12/2007 | Nelson et al. |
| 7,552,069 B2 | 6/2009 | Kepecs |
| 2002/0046235 A1 | 4/2002 | Foy et al. |
| 2002/0052801 A1 | 5/2002 | Norton et al. |
| 2002/0078083 A1 | 6/2002 | Armstrong |
| 2002/0178025 A1 | 11/2002 | Hansen et al. |
| 2002/0194081 A1 | 12/2002 | Perkowski |
| 2003/0043405 A1 | 3/2003 | Hill |
| 2003/0093331 A1 | 5/2003 | Childs et al. |
| 2003/0128229 A1 | 7/2003 | Colson et al. |
| 2003/0139979 A1 | 7/2003 | Moore |
| 2003/0169451 A1 | 9/2003 | Ponce |
| 2003/0172354 A1 | 9/2003 | Martinez Ponce |
| 2004/0019850 A1 * | 1/2004 | Purvis et al. ................ 715/517 |
| 2004/0117732 A1 | 6/2004 | McNeill et al. |
| 2004/0122831 A1 * | 6/2004 | Ha et al. ....................... 707/100 |
| 2004/0133542 A1 | 7/2004 | Doerksen et al. |
| 2004/0205645 A1 | 10/2004 | Hoffman |
| 2004/0205656 A1 | 10/2004 | Reulein et al. |
| 2005/0038668 A1 | 2/2005 | Singh et al. |
| 2005/0040230 A1 | 2/2005 | Swartz et al. |
| 2005/0050442 A1 | 3/2005 | Pope et al. |
| 2005/0129423 A1 | 6/2005 | Lester et al. |
| 2005/0159974 A1 | 7/2005 | Moss et al. |
| 2005/0160070 A1 | 7/2005 | Mashni et al. |
| 2005/0169558 A1 | 8/2005 | Dance et al. |
| 2005/0216357 A1 | 9/2005 | Wittmer et al. |
| 2005/0223319 A1 * | 10/2005 | Ohashi et al. ................ 715/517 |
| 2005/0234771 A1 | 10/2005 | Register et al. |
| 2005/0254885 A1 | 11/2005 | Laufer |
| 2005/0267804 A1 | 12/2005 | Lonsbury et al. |
| 2005/0283410 A1 | 12/2005 | Gosko |
| 2006/0048042 A1 | 3/2006 | Sembower et al. |
| 2006/0048053 A1 | 3/2006 | Sembower et al. |
| 2006/0111928 A1 | 5/2006 | Fisher et al. |
| 2006/0178917 A1 | 8/2006 | Merriam et al. |
| 2006/0190331 A1 | 8/2006 | Tollinger et al. |
| 2007/0005580 A1 | 1/2007 | Rinearson et al. |
| 2007/0011607 A1 | 1/2007 | Lazareck et al. |
| 2007/0038931 A1 | 2/2007 | Allaire et al. |
| 2007/0101259 A1 | 5/2007 | Grigoriadis et al. |
| 2007/0130509 A1 | 6/2007 | Gombert et al. |
| 2007/0260671 A1 | 11/2007 | Harinstein et al. |
| 2008/0028300 A1 * | 1/2008 | Krieger et al. ................ 715/255 |
| 2008/0103885 A1 | 5/2008 | Hashim et al. |
| 2008/0275755 A1 | 11/2008 | Brustein et al. |
| 2009/0241015 A1 | 9/2009 | Bender et al. |

OTHER PUBLICATIONS http://pages.ebay.com/catalpg/; eBay Fall Catalog, printed Sep. 19, 2006; pp. 2.

Blachman and Peek, "How Google Works—Google Guide", Feb. 2, 2007. Retrieved from http://www.googleguide.com/google_works.html.

http://www.scienceblog.com/community/older/2003/E/20032932.html; Wireless PDA Software Helps Grocery Shoppers Find Items; Apr. 2003; from Georgia Insitute of Technology Research News; 5 pp.

www.bigmachines.com/proposal_generator.php, Big Machines, printed Apr. 17, 2008.

www.business-integrity.com/document-assembly.html. Business Integrity, printed Apr. 17, 2008.

http://realfast.com, Realfast, printed Apr. 17, 2008.

* cited by examiner

AUTOMATED ASSEMBLY OF A COMPLEX DOCUMENT BASED ON PRODUCTION CONSTRAINTS

BACKGROUND

Various ways of customizing information are well known in the art. Personalized information service providers allow users to view news content in a particular category. For example, U.S. Patent Application Publication Number 2006/0048053, the disclosure of which is incorporated herein by reference, discloses automatically generating documents by having a user fill out a user profile, querying repositories for content matching the user's interest, filtering the results and applying automated layout techniques. In U.S. Patent Application Publication Number 2006/0048042, the disclosure of which is incorporated herein by reference, an individual and personalized report document is created. The document is created using a user profile to determine interests and preferences, finding content that matches, filtering the results by scoring and profiling, applying layout techniques, delivering the document and then tracking the user's usage of the document and applying that to the profile. However, the systems described above do not contain external constraints regarding the content to be placed in the layout.

In addition to customized documents and news service, customized books are also known in the art. U.S. Patent Application Publication Number 2007/0011607, the disclosure of which is incorporated herein by reference, describes creating a customized storybook with illustrations. However, the selection of items for printing in this book does not include or consider constraints based on the printing device or other external constraints.

The disclosure contained herein describes methods of resolving one or more of the problems discussed above.

SUMMARY

In one embodiment, a method for assembling a document may include generating a set of candidate content items for inclusion in the document. The content items may be stored in a computer-readable storage medium. Optionally, one or more production criteria may be added to the set of candidate content items. An inclusion constraint is automatically applied to the set to determine whether the set satisfies the inclusion constraint. If the set does not satisfy the inclusion constraint, one or more of the production criteria may be modified. A complex document is published with the modified production criteria and the candidate content items.

In an alternate embodiment, a method of assembling a document may include generating a set of candidate content items by selecting a plurality of content items. A set of production criteria may be selected for printing the candidate content items. If the production criteria in the set and the candidate content items in the set do not satisfy an inclusion constraint, the conflict may be resolved. One or more candidate content items in the set may be identified to be removed. The identified candidate content items may be removed from the set. One or more production criteria in the set may be identified to be modified. The identified production criteria may be modified. A document may be created that includes the candidate content items that were not removed. The document may be published in accordance with modified production criteria.

In one embodiment, an automatic document creation system may include one or more storage media containing electronic representations of a plurality of content items. A computing device may select a set of candidate content items from the content items in the storage media, selects a set of production criteria. The computing device may apply an inclusion constraint to the set of production criteria to determine whether the set satisfies the inclusion constraint. If the inclusion constraint is not satisfied, the computing device may identify one or more production criteria in the set that may be modified. The computing device may receive a user selection of at least one of the production criteria that may be modified and may modify the identified production criteria according to the user selection. The computing device may create a document that includes the modified production criteria and the candidate content items. A printing device may publish the document.

DETAILED DESCRIPTION

Figure 1:
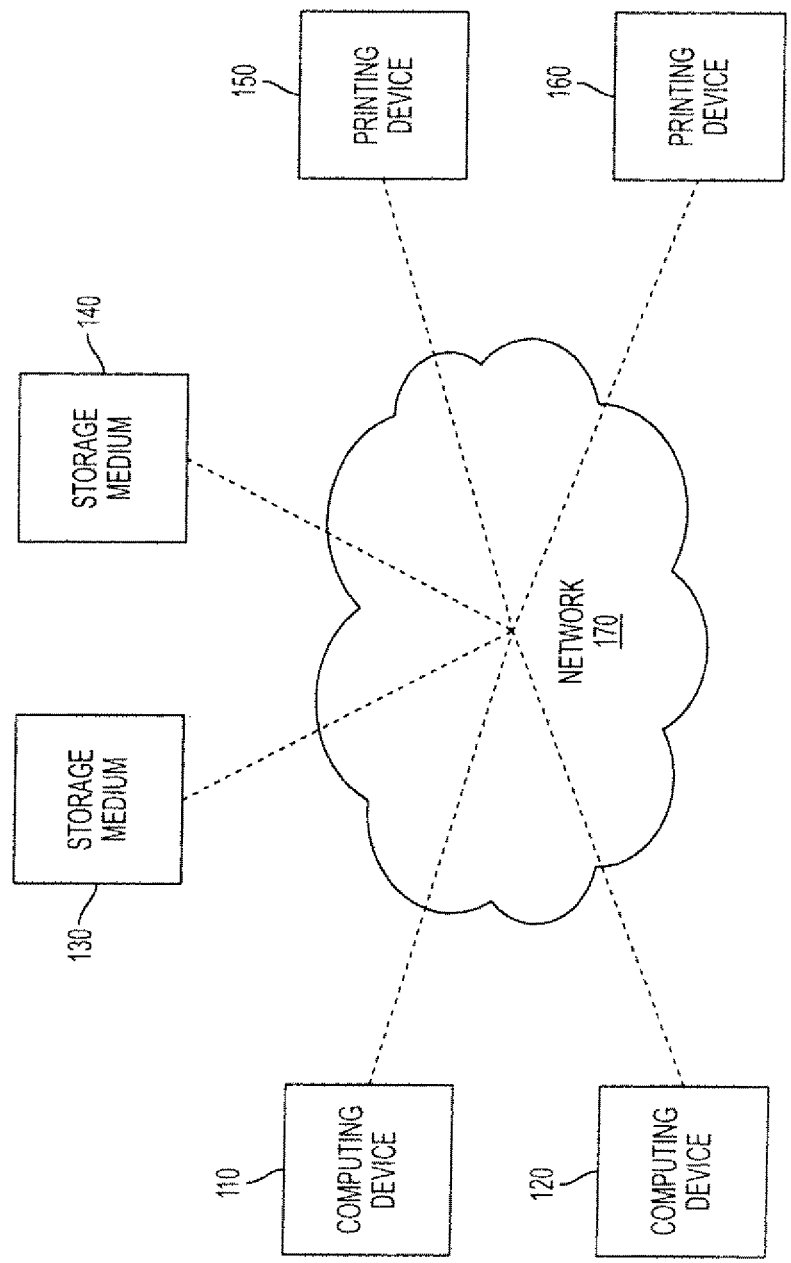
FIG. 1 depicts a block diagram that illustrates exemplary elements of an automated print job assembly system.

Before the present methods, systems and materials are described, it is to be understood that this disclosure is not limited to the particular methodologies, systems and materials described, as these may vary. It is also to be understood that the terminology used in the description is for the purpose of describing the particular versions or embodiments only, and is not intended to limit the scope, For example, as used herein and in the appended claims, the singular forms "a," "an," and "the" include plural references unless the context clearly dictates otherwise. In addition, the word "comprising" as used herein is intended to mean "including but not limited to." Unless defined otherwise, all technical and scientific terms used herein have the same meanings as commonly understood by one of ordinary skill in the art, FIG. 1 depicts an exemplary embodiment of a system for automated assembly of a complex document based on one or more production constraints, The system includes one or more computing devices 110, 120 and one or more storage media 130, 140. Each storage medium may be any repository of searchable data, such as a computer-readable memory, database, table or other medium. The data includes user-selectable content elements for inclusion in a personalized document. The storage media communicate with one another and with one or more computing devices 110, 120 and one or more printing devices 150, 160 via a network 170 such as a local area network (LAN), wide area network (WAN), Internet or another communications network. Alternatively, one or more of the storage media may be contained within any of the computing devices. Each computing device 110 or 120 may be any type of computing device such as, for example, a server, a personal computer, a personal digital assistant, a web-enabled phone, a gaming system, a smart terminal or a dumb terminal and/or any other electronic device capable of communicating in a networked environment. A printing device 150 or 160 is an electronic device that is capable of receiving commands and printing text and/or images on a substrate. Printing devices may include, but are not limited to, printers, copiers, faxes, scanners or other devices using ink or toner. As used herein, the words ink and toner are used interchangeably to refer to wet or dry material that forms an image or text on a substrate. Printing devices may also contain a combination of functions.

Figure 2:
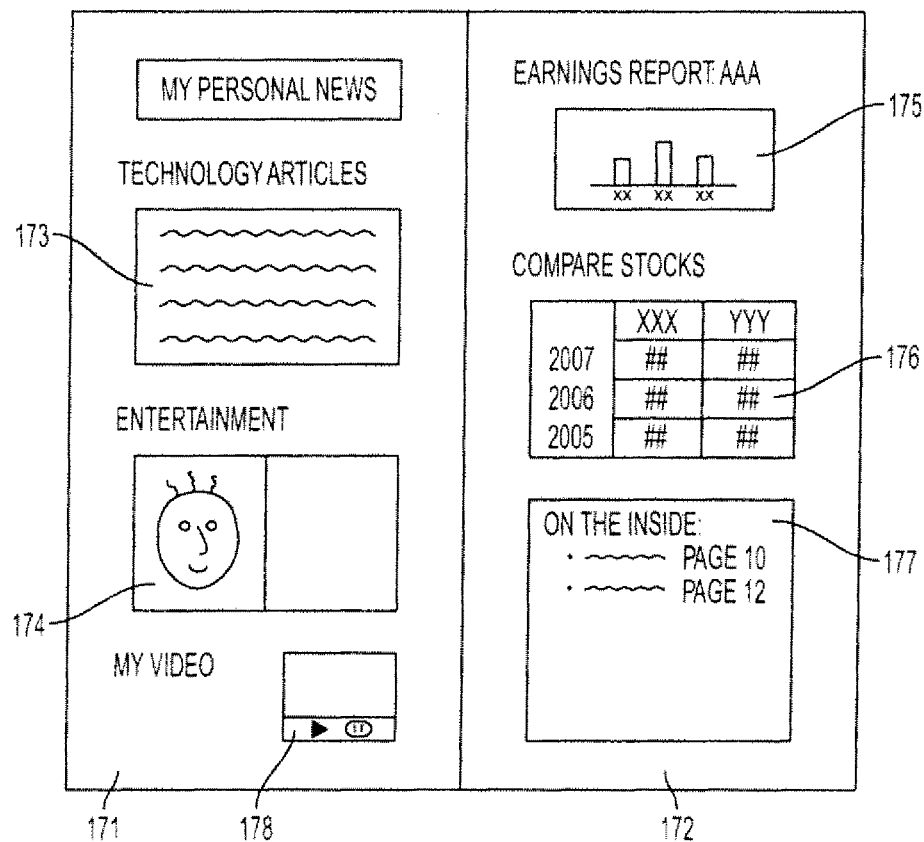
FIG. 2 illustrates an exemplary complex document.

The content elements in the storage media may include one or more simpler documents that, when collected, may be together printed in a complex document. As used herein, a complex document is a printed or electronically displayed document that is made by assembling multiple content items that are retrieved from the storage medium. A complex document is information graphically arranged in a space. A complex document may be, but is not limited, to a virtual document, a printed page, pages, booklet, or book. For example, referring to FIG. 2, a complex document may include any number of printed pages 171 and 172, with content items such as articles 173, photos 174, reports or chats 175, tables 176, indices or tables of content 177. A content item may be computer-readable information such as electronic text or images. In one embodiment, a content item may be formatted to be placed onto a page. For example, a content item may be, but is not limited to, chapters of a book, sections of a newspaper, an article, a publication or a magazine. Alternatively, or in addition, a content item may include news articles, scientific, technical, or medical publications and portions of a yearbook. Any content item may span multiple pages, and/or multiple content items may be included on a single page. When provided in electronic form, some or all of the content items may include multimedia elements 178 such as video, audio material, or links to additional content.

Figure 3:
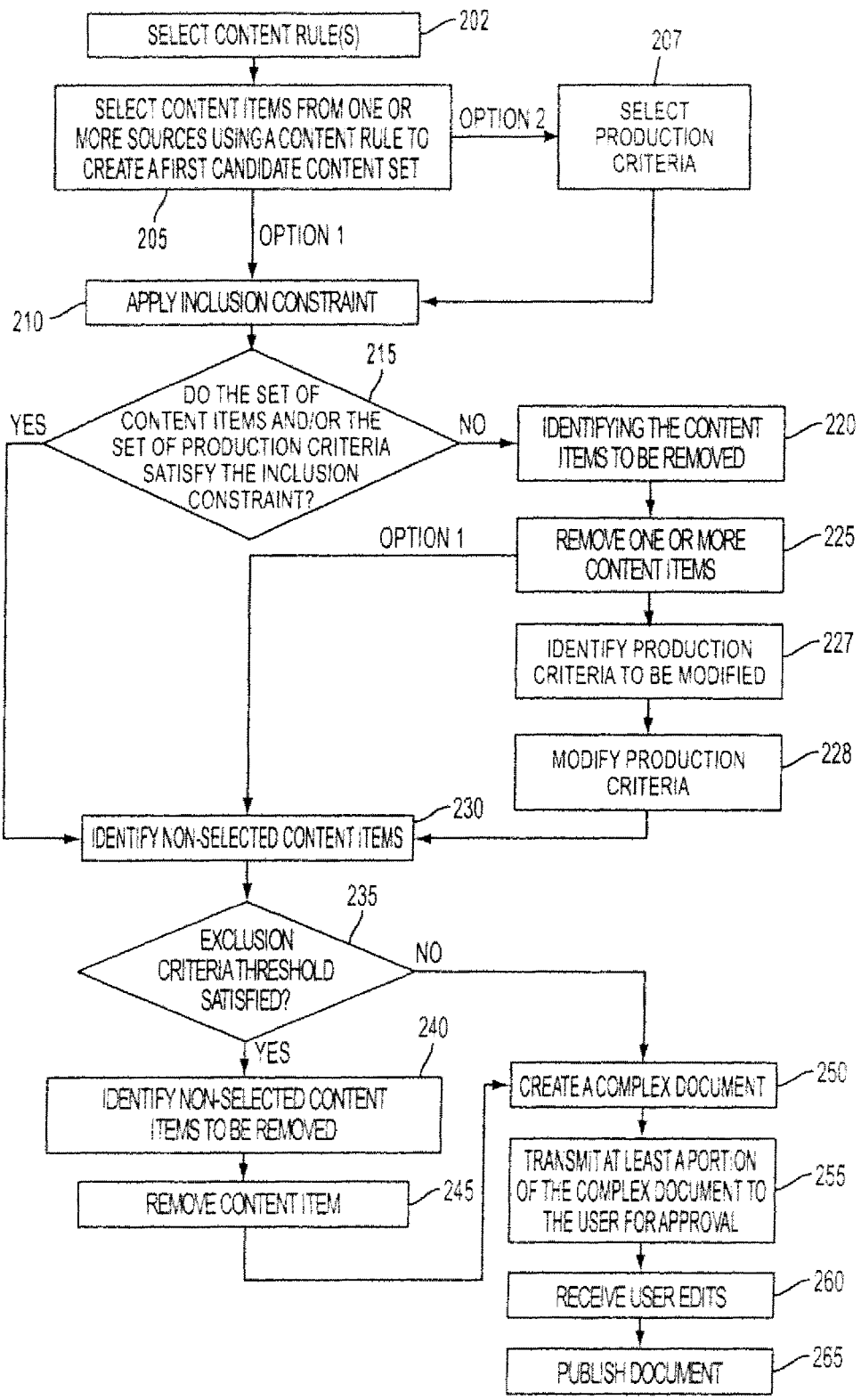
FIG. 3 depicts an exemplary embodiment of a method of assembling personalized content and production alternatives.

FIG. 3 discloses a flowchart of one embodiment of creating a complex document for printing using personalized content. In one embodiment, one or more content rules are selected 202. A content rule is a user-created or predetermined set of instructions used to perform a mathematical operation and obtain a result. A content rule may be used to dynamically select one or more content items to include in a complex document. Some or all of the content rules may predetermined, and/or some or all of the content rules may be chosen by a user. A user is any person creating a complex document. In one embodiment, a user may choose from a pre-selected group of content rules that may be presented in a drop-down menu, a set of choices, a list of options or another format. In another embodiment, a user may create a content rule using searchable rules and/or queries. In another embodiment, the content rule may be a simple Boolean search expression. For example, a content rule may be received using a type of search engine. Alternatively, a content rule may be a more structured attribute database style query.

A content rule is used to dynamically select content items from one or more computer-readable storage media 205. A computer-readable storage medium may include, but is not limited to, media capable of storing data structures such as a database, table, list or chart. The computer-readable storage medium may include a plurality of content items. In one embodiment, a content rule may be used to trigger a search for content items to collect for potential inclusion in a complex document. The process of selecting content items may be repeated until all selected content rules have been applied. When completed, a set of candidate content items may be available.

After creating the candidate content items set, an inclusion constraint may be applied 210 to determine whether the content items may be included in the complex document. The inclusion constraint is a characteristic that is used to determine whether all candidate content items in the set may be included in the complex document. The inclusion constraint may include parameters such as a maximum per-item cost and a maximum total item cost. For example, an inclusion constraint may he a physical printing constraint such as a maximum number of pages that may he printed by the printing device. Alternatively, the inclusion constraint may be a cost constraint such as a default cost, an amount that the user has paid, or a maximum payment amount that the user has identified. As a further alternative, an inclusion constraint may be a legal constraint such as a license fee, a purchase price, or an indication of whether the copyright holder has authorized publication of the content item in the manner, format or volume requested by the user.

Optionally, one or more production criteria may be selected 207 by the user and/or the system. Production criteria are used to determine the appearance of the document containing the content items. Production criteria may include, but are not limited to, features such as, binding selection, media, covers, and/or ink type. In one embodiment, there may be a default set of production criteria. In one embodiment, a user may choose some or all of the production criteria from offered options.

Each production criterion may have an associated cost. In some embodiments, the associated cost for a production criterion may be based on the amount or type of selected candidate content. Additionally, there may be a cost associated with each production criterion. For example, a method of binding may be a production criterion. Binding may include any manner of physically Joining sheets. Binding costs may include the costs for the steps of one or more of the following: trimming, folding, collating, stitching, stapling, perfect binding, tape binding, and/or edge stitching. In another example, a production cost may be associated with a group of production criteria. For example, a per-page production cost may include all costs associated with producing a physical sheet with printed content. Page costs may include, but are not limited to, one or more of the following substrate cost, impression count cost, and "click" charges associated with printing device usage.

Optionally, the system may determine whether the selected set of production 210 criteria satisfy the inclusion constraint 215. In another embodiment, the total cost of the set of candidate content items and the set of production criteria may be compared with the inclusion constraint 215. The inclusion constraint may be a cost constraint. A cost constraint is a maximum total cost permitted for the complex document, For example, a cost constraint may be the total cost permitted in a budget. The cost constraint may include one or more sub-constraints, such as the total cost allotted for copyright fees, license fees, ownership fees and/or other fees associated with using content items and as well as the costs for the selected production criteria associated with the complex document. In one embodiment a cost constraint may be applied after all the content items and the production criteria are selected for a complex document. In one embodiment, a cost constraint may be applied after all the content items are determined for a particular content rule. In other embodiments, a cost constraint may be applied at different times during the creation of a complex document.

In one embodiment, a cost may be associated with each content item. The cost of the content item may be the amount of money needed to include the content item in the complex document. The cost may be determined by, but is not limited to, copyright fees, ownership fees, and/or usage fees. In various embodiments, the cost may be included with a content item as metadata stored with the content item in the storage medium, or otherwise associated with the content items.

If the set of candidate content items and/or the set of production criteria do not satisfy the inclusion constraint 215, then one or more of the content items may be removed 225 from the candidate content items set and/or the production criteria set may be modified 228 if before publication occurs. Before removal 225, the candidate content items to be removed may be identified 220 by one or more of the following criteria or methods: (i) requiring the publication to include mandatory minimum content (e.g., all introductory law textbooks must contain a chapter on ethics); and (ii) ranking the content items based on criteria such as freshest, highest rated, most popular, prior use by the user, third party citations and/or links to the content item, and/or randomization.

Additionally or alternatively, the production criteria may be identified 227. If the costs of the production criteria and/or the content items exceed the inclusion constraint, then the production criteria may be modified 228. In one example, the user may be permitted to switch sections of the document from color to monochrome to reduce the cost. Alternatively, the user may be offered the ability to switch to cheaper production criteria such as changing the media to a cheaper option, changing the binding from coil bound to tape bound, and/or changing the chapter separators from tabs to color inserts. In one embodiment, the production criteria may alter how job selections are processed in prepress. For example, a user may choose to scale down print subsections of the document so that less important sections require half as many pages as compared to the more important sections.

In some embodiments, the system and method may identify one or more non-selected content items 230 from one or more sources. The non-selected content items may include content items not requested or ordered by a user, such as advertising or other promotional content. The system may determine whether any or all of the non-selected content items satisfy an exclusion constraint. An exclusion constraint is a characteristic that can be used to determine whether any or all of the non-selected items can be omitted from the complex document 235. For example, an exclusion constraint may be a minimum cost to be paid for a complex document. If the user pays less than the minimum cost, then all of the non-selected content (e.g., advertising) may be included in the complex document. Alternatively, if the user pays a higher cost, the advertising content may be reduced or eliminated 245. Optionally, the content items may be ranked 240, or different exclusion criteria thresholds may be available to select different content or amounts of content for removal.

Optionally, the inclusion criteria may be applied 210 before the exclusion criteria are applied 235. Alternatively, the exclusion criteria may be applied 235 first. In other embodiments, multiple criteria for inclusion and/or exclusion may be applied in any desired sequence.

If the inclusion constraint is satisfied 215, then a complex document may be created 250 using all the candidate content items. However, if the inclusion constraint is not satisfied, then the conflict may be resolved by ranking the candidate content items 220. The candidate content items may be ranked in a variety of ways. In one embodiment, the candidate content items may be ranked by, but not limited to, the most recently added, highest rated, most popular volume of prior use by the user, and/or randomized selection. For example, content if items with a larger number of citations may be favored over less cited work. Alternatively, the conflict may be resolved by ranking the content item based on its similarity to the content rule. The content items that are not as well matched may be removed 225 in order to resolve a conflict.

After ranking the candidate content items, one or more content items may be removed from the selected content items 225. In one embodiment, after one or more content items are removed, the sum of the cost of the remaining candidate content items that were not removed may be determined. The sum of the cost of the candidate content items that were not removed may be compared to the cost constraint 215. If the cost constraint is exceeded, one or more content items may be removed 225 until the total cost of the non-removed candidate content items does not exceed the cost constraint.

Once the inclusion criteria and/or exclusion criteria are satisfied, the remaining content may be automatically assembled into a complex document 250. The complex document may be created by using the modified production items and the candidate content items that were not removed. Some or the entire complex document may then be transmitted to a user for approval 255. The user may be permitted to edit the document 260 by removing or moving some or all of the content items. Alternatively, no user edits may be permitted. The final document is then published on an electronic or printing device.

For example, a professor may want to create a complex document. The professor may select content items using a content rule relating to a specific topic of research 205. In this embodiment the content items may be articles and journal publications. Six articles may be dynamically selected. A cost may be associated in the metadata of each article. In one embodiment, the cost associated may be a copyright fee. The cost of the copyright fees for the six articles may total $15. Additionally the professor may have chosen production criteria 207 such as a clear plastic front cover, a hard plastic back cover and a metal binding. The cost for the selected production criterion may be $5. Therefore, the expected total cost of the document may be $20 210. However, the cost constraint, or budget, for creating the complex document may be $10. Since the total cost exceeds the cost constraint 215, the six articles may be ranked 220. In one embodiment, the articles may be ranked by how closely each article is related to the topic. The article most related to the topic may be ranked first. The least related article may be removed 225. In addition to, or instead of removing the content items, the production criterion may be modified 228. The professor may choose to eliminate the front and back covers and replace the metal binding with a plastic binding. The total cost of binding the five remaining articles may be determined. If the total cost is less than $10, then a complex document may be created with the five articles in a plastic binding 250. A portion of the complex document may then be transmitted to a user for approval 255.

Figure 4:
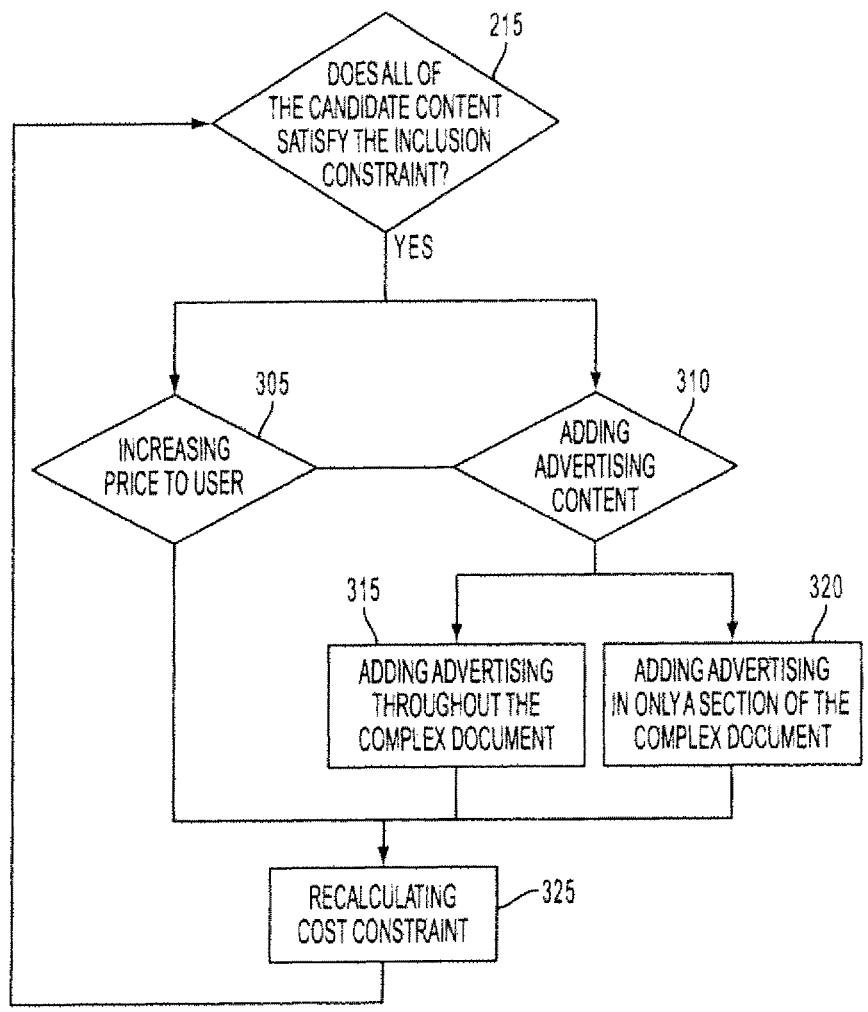
FIG. 4 depicts an exemplary embodiment of a method of increasing the cost constraint.

In some embodiments, a user may be permitted to adjust the inclusion constraint if the set of production criteria and/or the set of candidate content items do not satisfy the inclusion constraint FIG. 4 depicts an exemplary embodiment wherein a user may increase a cost constraint when the total cost exceeds the cost constraint. When the total cost exceeds a cost constraint 215, the cost constraint may be adjusted. In one embodiment, a user may adjust the cost constraint by agreeing to pay a higher price for the complex document. A user may include more content items in the complex document or more expensive production criteria by agreeing to pay more for the complex document. If the user pays a higher price for the complex document, the cost constraint may be increased.

For example, a school may produce a yearbook for a certain "base cost" and that cost may be associated with a certain base selling price. However, a user may want the yearbook to include information about clubs to which the user belongs. Alternatively, or in addition, the user may want a leather cover and glossy pages for their yearbook. This extra content and/or the expensive production criteria may exceed the cost constraint 215. However, a user may be allowed to include these clubs and have a leather book with glossy pages in their version of the yearbook for an increased price 305, When the user agrees to pay the increased price, the cost constraint increases and the expected total cost of the document may no longer exceed the adjusted cost constraint, In alternative embodiments, for an increased price, the yearbook may include, but is not limited to, more pictures of students, sports teams pictures, stories, color pages, and a more expensive binding or cover.

In alternative or additional embodiment, a cost constraint may be automatically increased by adding advertising content 310. Advertising content is the use of a printed medium to communicate a marketing message. Advertising content may be used to alter the cost constraint and may resolve a conflict. In one embodiment, adding advertising content to a complex document may resolve a conflict between a cost constraint and the total cost. Advertising content may be stored in a processor readable storage medium. Advertising content may be stored with the content items in the computer-readable storage medium. Alternatively advertising content may be stored in a separate advertising storage medium. The advertising storage medium may include, but is not limited to, a database, a table, a list or a chart. Advertising content may be stored in a computer readable format such as electronic images and text.

Various amounts of advertising content may be added to a complex document The more advertising content added, the greater the increase in the cost constraint. In one embodiment, advertising content may be included throughout a complex document 315. Alternatively, advertising content may appear only in the sections of the complex document such as, but not limited to, the front pages, the back pages, or the index 320. In one embodiment, various costs may be associated with the placement of the advertising content. In one embodiment, the cost constraint increase may be higher if the advertising content is placed throughout the complex document as opposed to placing advertising content only in the index. In one embodiment; advertising content may be placed in the complex document page by page. In another embodiment, the advertising contents may be placed in a complex document through a template or style sheet.

For example, referring back to the professor example, all six articles may be published with metal binding, a front and a back cover, and may comply with the cost constraint, if advertising content is placed in the complex document. In one embodiment, the advertising content may need to be placed throughout the complex document so that the total cost does not exceed the cost constraint. Alternatively, the advertising content may only need to be placed on the last few pages of the complex document so that the total cost does not exceed the cost constraint.

If a user pays an increased price and/or advertising content is added to the complex document, the constraint may be recalculated 325. The recalculated constraint may be used to determine if it is now greater than the total cost.

Figure 5:
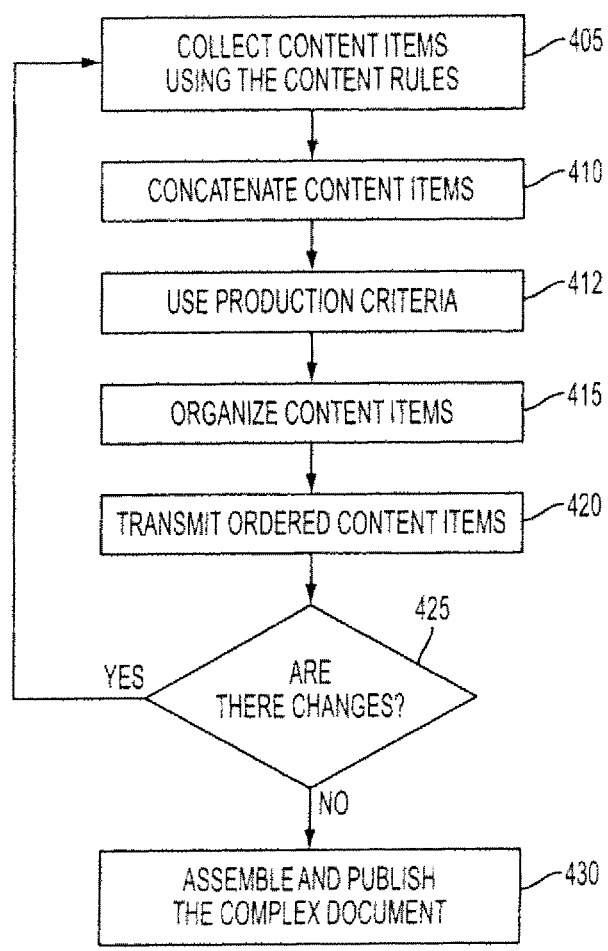
FIG. 5 discloses an exemplary embodiment of a method of creating a complex document after conflicts are resolved.

Once the selection of candidate content items and non-selected content items (e.g., advertising) is complete, the complex document can be assembled. FIG. 5 discloses a flowchart of one embodiment of assembling the complex document. The content items may be collected from the computer-readable storage medium using one or more content rules 405. In one embodiment, a content item may be represented as an electronic file. A complex document may be created by having a parent file with pointers to the content files as child files. In one embodiment, pointers may be, but are not limited to, web links or other electronic methods to identify stored files. A structuring method may allow each or several content items to be treated as an independent job for production purposes. This method may be completed by, but is not limited to, Raster Document Object (RDO), Personalized Printing Markup Language (PPPML) and/or files for printing.

The candidate content items may, be concatenated to form a complex document 410. In one embodiment, the structure of the complex document may be determined by the selected production criteria 412. Alternatively, the structure may be determined by the type of representation required for proofing the job.

In one embodiment, the content items included in the complex document may be organized 415. The content items inside the complex document may be organized by, but are not limited to, date of publication of the content item, timestamping the content item, alphabetizing by title, alphabetizing by topic, alphabetizing by author's name, a user-defined order, or randomly organized. In one embodiment, organizing a complex document may include creating navigation aids such as, but is not limited to, a table of contents, page numbers, and an index.

In one embodiment, at least a portion of the ordered content items in the complex document may be displayed or printed to the user 420 for approval and/or editing. In one embodiment only a portion of the complex document is delivered to the user. In one embodiment, the user may receive a proof copy of the complex document. In one embodiment, the user may receive a portion of the complex document in a format, including but not limited to, a word processing document, spreadsheet, portable document format (PDF) product, flowchart application, presentation or another word processing program. For example, only the table of contents may be displayed to a user. In one embodiment, only the first five pages of the complex document may be displayed. Alternatively, a list of the content bill of materials including publishers, sources, authors, publication data and copyright royalties may be transmitted to a user. In another embodiment, the entire document may be transmitted to a user. In one embodiment, a portion of a complex document may be displayed on a user s computing device. Alternatively, a portion of a complex document may be transmitted to a user s printing device.

In one embodiment, the user may change the order of the content items in the complex document after it is transmitted to the user 425. Alternatively, the user may add or delete content items included in the complex document. Additionally, a user may add or delete navigational aids. In one embodiment, the navigational aids may affect a printing constraint. In one embodiment if a user adds or deletes any content item or navigational aid, the constraint may be reexamined and the complex document may be revised 405. Alternatively, a constraint may not be revisited and the complex document may be produced.

Once the complex document is assembled and the user approves, the complex document may be published 430 according to the production criteria selected by the user. In one embodiment, the document may be printed. In one embodiment, the production criteria may include having some of the complex document printed in color and other parts printed in grayscale. The complex document may be split according to the printing devices so as to match the printer capabilities with the job content.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method of assembling a document comprising:
generating a set of candidate content items by selecting a plurality of content items from a computer-readable storage medium based on one or more content rules, wherein each of the content items has an associated financial cost;
selecting a set of production criteria for printing the candidate content items, wherein each of the production criteria has an associated financial cost;
automatically applying an inclusion constraint to the set of production criteria, wherein the inclusion constraint comprises a maximum total cost, and wherein applying the inclusion constraint comprises:
summing the financial costs associated with each candidate content item and each production criteria to yield a total cost, and
comparing the total cost to the maximum total cost;
if the set of production criteria does not satisfy the inclusion constraint, resolving a conflict by:
identifying one or more production criteria in the set that may be modified,
receiving a user selection of one or more of the production criteria that may be modified, and
modifying the identified production criteria according to the user selection;
identifying a plurality of non-selected content items from the computer-readable storage medium;
automatically applying an exclusion constraint to the plurality of non-selected content items to identify one or more of the non-selected content items that satisfy the exclusion constraint;
creating a document that includes the modified production criteria, the candidate content items, and the non-selected content items that were not identified as satisfying the exclusion constraint; and
publishing the document.

2. The method of claim 1 wherein automatically applying an inclusion constraint and resolving a conflict are repealed until the set of production criteria satisfies the inclusion constraint.

3. The method of claim 1, further comprising:
automatically adjusting the inclusion constraint based on an amount of advertising content to be included in the document.

4. The method of claim 1, further comprising:
permitting a user to adjust the inclusion constraint.

5. The method of claim 1, further comprising:
if the set of content items does not satisfy the inclusion constraint, resolving a conflict by:
identifying one or more candidate content items in the set to be removed, and
removing the identified candidate content items from the set.

6. The method of claim 1 wherein creating the document comprises ordering the candidate content items based on one or more of the following:
date of publication of the content item,
time-stamping the content item,
user-defined order,
alphabetizing by title,
alphabetizing by topic, and
alphabetizing by author's name.

7. The method of claim 1 wherein production criteria comprises an associated cost based on the type of candidate content items.

8. The method of claim 1 wherein the non-selected content items comprise advertising content.

9. A method of assembling a document comprising:
generating a set of candidate content items by selecting a plurality of content items, wherein each of the candidate content items have an associated financial cost;
selecting a set of production criteria for printing the candidate content items, wherein each of the production criteria have an associated financial cost;
if the production criteria in the set and the candidate content items in the set do not satisfy an inclusion constraint that comprises a maximum total cost, resolving a conflict, by a computing device, by:
identifying one or more candidate content items in the set to be removed,
removing the identified candidate content items from the set,
identifying one or more production criteria in the set to be modified, and
modifying the identified production criteria;
identifying a plurality of non-selected content items;
automatically applying, by the computing device, an exclusion constraint to the plurality of non-selected content items to identify one or more of the non-selected content items that satisfy the exclusion constraint;
creating a document that includes the candidate content items that were not removed and the identified non-selected content items; and
publishing the document in accordance with modified production criteria.

10. The method of claim 9 wherein identifying one or more candidate content items to be removed comprises ranking the content items by at least one of the following:
most recently added,
highest rated,
most popular, and
volume of prior use by a user.

11. The method of claim 9 wherein automatically applying an inclusion constraint and resolving a conflict is repeated until the production criteria satisfies the inclusion constraint.

12. The method of claim 9, further comprising:
adjusting the inclusion constraint based on an amount of advertising content to be included in the document.

13. The method of claim 9, wherein the non-selected content items comprise advertising content.

14. An automatic document creation system, comprising:
a computing device;
a non-transitory computer-readable storage medium in communication with the computing device, wherein the non-transitory computer-readable storage medium comprises one or more programming instructions for:
selecting a set of candidate content items from the content items in the storage media based on one or more content rules, wherein each candidate content item is associated with a content cost,
determining whether a cost constraint is satisfied by the content cost associated with at least a portion of candidate content items in the set of candidate content items,
in response to the cost constraint not being satisfied:
ranking each candidate content item in the set of candidate content items based on a similarity between the candidate content item and the one or more content rules, and generating an updated set of candidate content items by removing one or more of the candidate content items based on its associated rank, in response to a cost associated with creating a document that includes the updated set of candidate content items not exceeding a minimum cost, identifying one or more advertisements for inclusion in the document, and creating a document that includes the updated set of candidate content items and the identified advertisements; and a printing device in communication with the computer-readable storage medium, wherein the printing device is configured to publish the document.

15. The system of claim 14, wherein the computer-readable storage medium comprises one or more programming instructions for:

determining whether the cost constraint is satisfied by the updated set of candidate content items; and in response to the cost constraint not being satisfied by the updated set of candidate content items, repeating the generating an updated set of candidate content until the updated set of candidate content items satisfy the cost constraint.

16. The system of claim 14, wherein the one or more programming instructions for selecting a set of candidate content items from the content items in the storage media based on one or more content rules comprise one or more programming instructions for selecting a set of candidate content items, wherein each candidate content item is associated with one or more of the following:

a copyright fee;
a license fee; and
an ownership fee.

* * * * *